US009582970B2

(12) United States Patent
Rosenblatt

(10) Patent No.: US 9,582,970 B2
(45) Date of Patent: Feb. 28, 2017

(54) ELECTRONIC GAMING DEVICE AND METHOD OF PROVIDING GAMES HAVING PLAYER PROVIDED GAME ELEMENTS

(71) Applicant: SCRAPPY ELEGANT GAMING, LLC, Davisburg, MI (US)

(72) Inventor: Darryl Rosenblatt, Davisburg, MI (US)

(73) Assignee: Scrappy Elegant Gaming, LLC, Davisburg, MI (US)

( * ) Notice: Subject to any disclaimer, the term of this patent is extended or adjusted under 35 U.S.C. 154(b) by 262 days.

(21) Appl. No.: 14/318,155

(22) Filed: Jun. 27, 2014

(65) Prior Publication Data

US 2015/0379808 A1 Dec. 31, 2015

(51) Int. Cl.

*G06F 17/00* (2006.01)
*G07F 17/34* (2006.01)
*G07F 17/32* (2006.01)

(52) U.S. Cl.

CPC .......... *G07F 17/34* (2013.01); *G07F 17/3227* (2013.01); *G07F 17/3239* (2013.01)

(58) Field of Classification Search

USPC ........................................................ 463/16–25
See application file for complete search history.

(56) References Cited

U.S. PATENT DOCUMENTS 7,789,756 B2 * 9/2010 Jones ...................... G07F 17/32 463/16
2005/0003880 A1 * 1/2005 Englman ................ G07F 17/32 463/16
2005/0181860 A1 * 8/2005 Nguyen .............. G07F 17/3267 463/20
2010/0048282 A1 * 2/2010 Nicely ................ G07F 17/3211 463/20

* cited by examiner

*Primary Examiner* — Ronald Laneau
(74) *Attorney, Agent, or Firm* — Newman Law, LLC

(57) ABSTRACT

Systems and methods for providing games, such as wagering games, that include game features, such as symbols, that may be temporarily replaced or modified by player provided elements, if desired, wherein the player provided elements may function in the same manner as the symbols in one or more rounds of the game.

20 Claims, 8 Drawing Sheets

ELECTRONIC GAMING DEVICE AND METHOD OF PROVIDING GAMES HAVING PLAYER PROVIDED GAME ELEMENTS

TECHNICAL FIELD

The subject matter disclosed herein relates generally to electronic gaming machines and more particularly, to methods and systems for allowing players to play games having player provided game elements.

BACKGROUND OF THE INVENTION

At least some known slot machine is played by inserting cash, or in newer Ticket-In, Ticket-Out machines (TITO), a paper ticket with a barcode, into the machine. Play is initiated by pressing a lever or button, or on newer machines, by pressing a touchscreen on its face. The game itself may or may not involve skill on the player's part—or it may create the illusion of involving skill while only being a game of chance.

The object of the game is to win money from the machine. The game usually involves matching symbols, either on mechanical reels that spin and stop to reveal one or several symbols, or on simulated reels shown on a video screen. The symbols are usually brightly colored and easily recognizable, such as images of fruits, numerals or letters, and simple shapes such as bells, diamonds, or hearts; newer video slot machines use animated cartoon characters and images of popular characters from movies or television shows.

Most games have a variety of winning combination of symbols, often posted on the face of the machine (or available on a different screen, accessible by touching a button on the main touchscreen, on video slot machines). If a player matches a combination according to the rules of the game, the slot machine pays the player cash or some other sort of value, such as extra games.

Millions of dollars a year are spent by Slot Machine Manufacturers researching what symbols will appeal to the widest and most profitable demographic of slot players. As such, game manufacturers spend millions of dollars on licensing and entering into partnership agreements which allow for the use of specific brands and imagery within the content of their games. This is all done in an attempt to lure the player with images and symbolism that the slot manufacturers hope will appeal to their target demographic.

Therefore, it is extremely desirous to offer a machine that utilizes a player's own imagery which is stored on their mobile device, eliminating the "guess work" in the research and development process. Accordingly, new features are necessary to appeal to player interest and enhance excitement in order to entice longer play and increased profitability. The present invention is directed to satisfying these needs. The present invention also eliminates the need for slot machine manufacturers to pay licensing fees to various brands and content owners.

SUMMARY OF THE INVENTION

The invention is generally directed to systems and methods for allowing players to play games using player provided game elements.

In one aspect of the present invention, an electronic gaming device for allowing a player to play a game having player provided game elements is provided. The electronic gaming device includes a display device for displaying a game to a player, a database including a plurality of game features being associated with the game and a list of game elements, and a controller coupled to display device and the database. The list of game elements includes at least one player provided game element that is associated with at least one of the plurality of game features. The controller is configured to initiate a gaming session including displaying the game in response to a request received from the player, retrieve a game feature associated with the game, determine if the list of game elements includes a player provided game element being associated with the retrieve game feature, randomly determine an outcome of the game, and display the game outcome including the retrieved game feature including the corresponding player provided game element.

In another aspect of the present invention, a system for allowing a player to play a game having player specified game elements is provided. The system includes a plurality of electronic gaming devices, a database including a plurality of game features being associated with the game and a list of game elements, and a controller coupled to each electronic gaming device and the database. The list of game elements includes at least one player provided game element that is associated with at least one of the plurality of game features. Each gaming device includes a display device for displaying a game to a player. The controller is configured to initiate a gaming session including displaying the game on at least one of the plurality of electronic gaming devices in response to a request received from the player, retrieve a game feature associated with the game, determine if the list of game elements includes a player provided game element being associated with the retrieve game feature, randomly determine an outcome of the game, and display the game outcome including the retrieved game feature including the corresponding player provided game element.

In yet another aspect of the present invention, a method of allowing a player to play a game having player specified game elements is provided. The method includes the steps of initiating a gaming session on a gaming device including displaying a game, retrieving a game feature associated with the game from a database, determining if a list of game elements contained in the database includes a player provided game element being associated with the retrieve game feature, randomly determining an outcome of the game, and displaying the outcome including the retrieved game feature including the corresponding player provided game element.

BRIEF DESCRIPTION OF THE DRAWINGS

Other advantages of the invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF THE INVENTION

Figure 1:
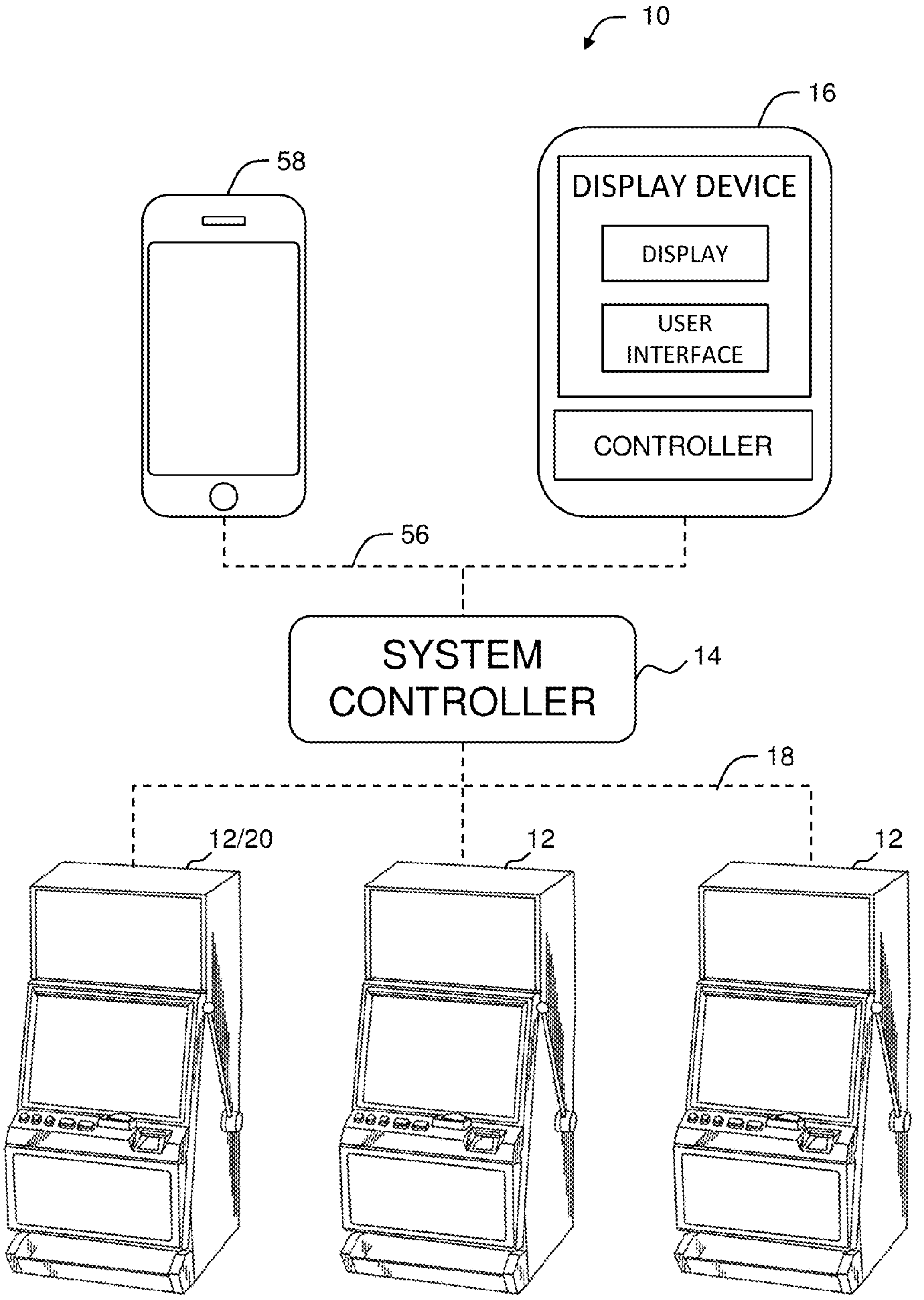
FIG. 1 is a schematic representation of a system for use in allowing a player to play a game having player provided game elements, according to an embodiment of the invention.

With reference to the drawings and in operation, the invention overcomes at least some of the disadvantages of known systems by providing, among other things, a system and gaming devices that allow players to provide personalized game elements for use in playing games. More specifically, the system allows players to transmit personalized elements such as, for example, photos, music, videos, and/or images from a personal mobile computing device to the gaming devices for use as game elements. The gaming devices, which may be electronic gaming machines, home computer, tablet, the same mobile computing device or another mobile computing device, replace one or more predefined game elements with the received player provided game elements to provide the player with a personalized gaming experience. For example, in one embodiment, the system may allow a player to transmit a photo from a player's smartphone to a gaming device, replace a predefined game symbol with the received player photo, and generate and display an outcome of the game using the player provided photo. In addition, the gaming devices may capture video images of the player during game play and post images of the player and the winning games to the player's social media accounts to enable the player to share the gaming experience with others.

By providing a gaming device that receives gaming content being provided by players and generates and displays games including the player provided elements, the present invention provides opportunities for players to personalized the gaming experience, thus increasing the enjoyment of the game and increasing the amount of revenue generated by the gaming device. In addition, the present invention allows game designers to provide customizable gaming experiences to players during a game without modifying the play of the game. It should be understood that players may receive queries to participate but may choose not to participate, that is, they may selectively "opt in" or "opt out" of any of the features described herein.

The present invention is generally directed to systems and methods for providing a game, such as a video slot game, to an electronic device, such as an electronic gaming machine (EGM) or other electronic platform. The present invention includes a system and method for sharing data and content between a personal mobile device and an electronic gaming machine. In one embodiment, the system includes an EGM such as, for example, a video slot machine, that includes a combination of one, or multiple video screens, utilizing one, or multiple reels (physical or virtual), that display an alignment of graphic symbols, on one, or multiple lines, that represent the outcome of a wager during normal or "bonus" round play. The EGM includes a mechanism by which an Electronic Gaming Machine can receive, store, and display MMS data (pictures, sounds, etc) from a player's mobile device, and apply said content for immediate use within an interactive wagering game, by replacing the existing (generic) symbols, backgrounds, sounds, music, etc. with content from a player's personal mobile device. The EGM may also include a mechanism by which the EGM, presents a touch-screen interface that allows the player to assign their personal content to game symbols, backgrounds, sounds, music, and bonus themes, replacing the "generic" symbols, sounds and music, contained within the game. Once the content is uploaded to the EGM from the mobile device, the content that is uploaded by the player, can be stored, for retrieval, by that specific player, for future play, on that machine, and other machines of the same type. The EGM may also include a mechanism by which the images and content, uploaded to an Electronic Gaming Machine, will be immediately deleted, upon termination of play, should the player elect not to save the configuration of content uploaded to the machine with a password. In addition, the system may include a means by which the core Hardware, Software, Firmware, Network, and Code of the Electronic Gaming Device are completely protected, as the aforementioned components are physically and electronically isolated, making access by the player's mobile device impossible. This feature of the invention protects both the operator and more importantly, the public or player as well as the licensing agency.

In one embodiment, the EGM may include a means by which microlouver (privacy) filters can be placed upon the screen of the EGM (at minimal manufacturing cost) to shield any potential spectators from player's content that would be deemed offensive by others. In addition, the EGM may include a camera, that would record the player's reaction to large wins, and then text a video or photograph of that event to their phone. This camera could also be used for video chat between players, within the casino while they are both playing the same type of EGM.

The system of the present invention facilitates several methods by which connectivity with the gaming device and the mobile can be achieved: 1) A downloadable software application ("App") that allows for direct access to the electronic gaming device: (a) The App can be downloaded from the website of the Manufacturer of the electronic gaming device. (b) The App can be downloaded by the player entering their phone number on the screen of the electronic gaming device. The game then "texts" the player a hyperlink to the manufacturer's website, where the app can be downloaded immediately to the player's mobile device. (c) The App can be downloaded from the Hotel/Casino Website. 2) Common Short Code "CSC": (a) content from a player's mobile device can be texted directly to the electronic gaming machine via MMS. 3) Email: (a) content can be emailed directly to the machine. The electronic gaming device will display an email address for the player to send the content to: Example: PEGE31245@GameManufacturer.com. 4) Data Port included with the EGM: (a) content can be transferred from the mobile device to the electronic gaming device through a revolving data port with a universal jack that would support virtually every personal mobile device in existence. 5) Wireless transmissions such as short-wavelength radio waves for exchanging data over short distances, for example Bluetooth™ wireless technology standard, and/or wireless transmissions using IEEE 802.11 standards, e.g. Wi-Fi™ networks.

Personal mobile devices may include, but are not limited to, devices that is both portable and capable of collecting, storing, transmitting or processing electronic data or images. Examples include laptops or tablet PCs, personal digital assistants (PDAs), and "smart" phones such as Blackberrys, and iphones. Personal mobile devices may also include storage media, such as USB hard drives or memory sticks, SD or CompactFlash cards, and any peripherals connected to the EGM, physically or wirelessly.

Through a disclaimer, player's will acknowledge their rights, and affirm they have permission to utilize the content uploaded from their personal mobile device for to the Electronic Gaming Machine. Players may therefore opt in or opt out. In as much, the hosting electronic device will be acting under the same set of IP responsibilities as a digital storage provider.

The system may also provide an interactive feature that offers wide spread advertising and marketing benefits for both the Slot Manufacturer and the Casino that hosts these particular types of machines. More specifically, upon the request of a player, prior to initiation of play, the player can choose an option to post photographs of their reaction to "Jackpots" on their social media accounts such as, for example, their Facebook® account. These photographs, taken by the machine automatically at the time that a "jackpot" is won, would be automatically be posted to the player's Facebook® account, these photos would feature a snapshot of the screen, and the player's candid reaction to the win. Information shared would include but not be limited to—The name of the machine, the amount of the jackpot, and the property where the guest was playing.

The invention is also directed to a system for providing methods as described above, which may be partially or wholly carried out in a variety of ways and/or through a variety of systems and devices, which may include, but are not limited to, an EGM for one or more players, standalone multiplayer platforms which may include a player interface such as a touchscreen display, through a home computer or portable computing device, such as a tablet computer or mobile phone capable of communicating with a server, network or over the Internet, global telecommunication network or world wide web. An EGM of the invention may include one or more processing devices in communication with a database or memory device, data input/output device and display device. The memory device may include data relating to the underlying game and embodiments of the invention as described herein, such as the preset criteria.

A selected embodiment of the invention will now be explained with reference to the drawings. It will be apparent to those skilled in the art from this disclosure that the following description of the embodiment of the invention is provided for illustration only and not for the purpose of limiting the invention as defined by the appended claims and their equivalents.

Figure 2:
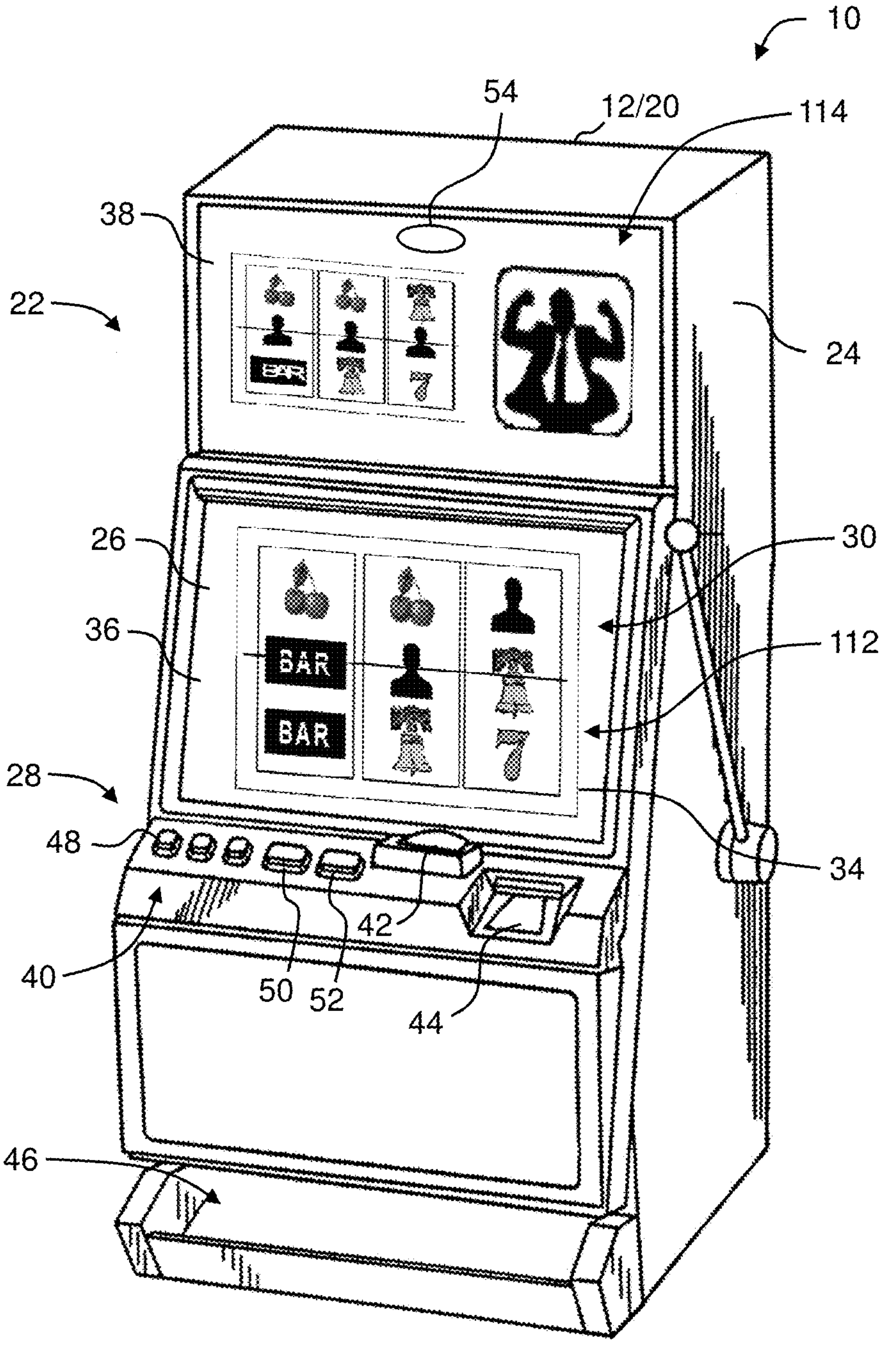
FIG. 2 is a schematic representation of a gaming device that may be used with the system shown in FIG. 1, according to an embodiment of the present invention.
Figure 3:
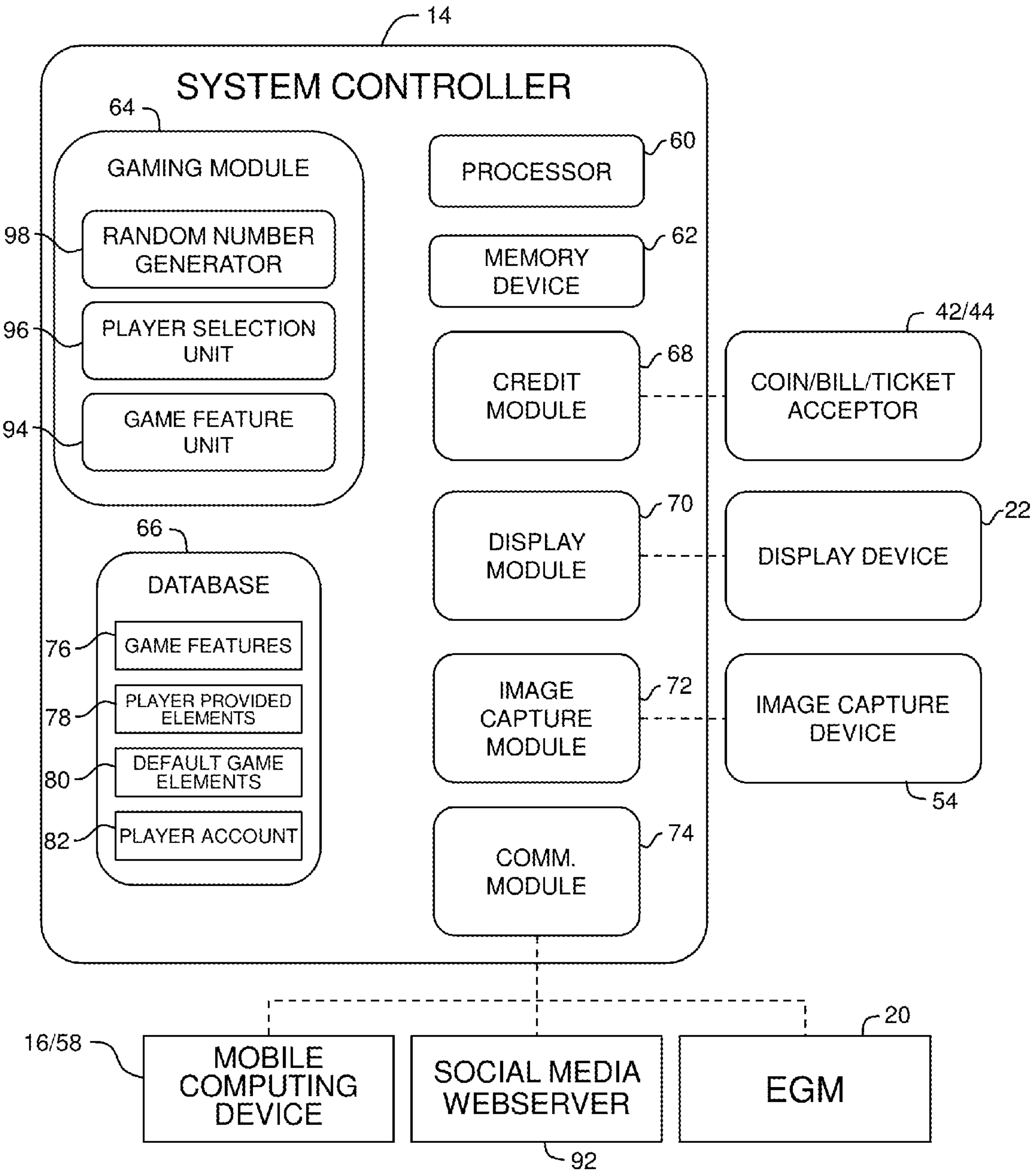
FIG. 3 is schematic representation of a system controller that may be used with the system shown in FIG. 1, according to an embodiment of the invention.

FIG. 1 is a schematic representation of a system 10 for use in allowing a player to play a game having player provided game elements, according to an embodiment of the invention. FIG. 2 is a schematic representation of a gaming device 12 that may be used with the system 10. FIG. 3 is schematic representation of a system controller 14 that may be used with the system 10. In the illustrated embodiment, the system 10 includes one or more user computing devices 16, one or more gaming devices 12, and a system controller 14. In the illustrated embodiment, the gaming devices 12 and the system controller 14 are coupled in communication with a local area network (LAN) 18. Alternatively, the gaming devices 12 and the system controller 14 may be coupled via a network such as, for example, an Internet link, an intranet, a WAN, dial-in-connections, cable modems, wireless modems, and/or ISDN lines. In one embodiment, the system controller 14 may be implemented by one of the gaming devices 12. Alternatively, the system controller 14 may be located remotely with respect to the gaming devices 12.

In the illustrated embodiment, the gaming device 12 includes a video gaming machine 20 preferably installed in a casino. The gaming machine 20 includes a display device 22 for displaying a plurality of games and to enable a player to interface with the gaming machine 20. The system controller 14 is operatively coupled to the display device 22 to enable a player to play games being displayed on the display device 22. The gaming machine 20 may also include a housing assembly 24 that is configured to support the display device 22 and/or the system controller 14 from a supporting surface.

In the illustrated embodiment, the display device 22 includes a display 26 and a user input device 28. The display 26 is configured to display game screens 30 (shown in FIGS. 5-8) includes graphical user interfaces displaying information and selection areas to allow an player to interact with the gaming machine 20. In one embodiment, the gaming machine 20 is configured to display a game including a plurality of game symbols being displayed with a plurality of reels in a slot-type game 32 (shown in FIG. 7). The gaming machine 20 may also display indicia and/or symbols for use in a game such as, for example cards used by a card game, roulette wheel and symbols used in a roulette game, and/or any type of game which allows a player to make a wager, play a game, and potentially provide the player an award based on an outcome of the game and a paytable. The display 26 may include a flat panel display, such as a cathode ray tube display (CRT), a liquid crystal display (LCD), a light-emitting diode display (LED), an organic light-emitting diode display (OLED), an active-matrix organic light-emitting diode display (AMOLED), a plasma display, and/or any suitable visual output device capable of displaying graphical data and/or text to a user. In addition, in one embodiment, the display 26 may include a microlouver layer 34 that is configured to control the distribution of light being generated by the display to limit the viewing angle of the images being displayed on the display 26 to a predefined viewing angle. The microlouver layer 34 increases privacy of the player and/or control reflections to improve the display contrast.

In one embodiment, the display device 22 may include a first display 36 and a second display 38. The first display 36 may be configured to display a game including game symbols and/or indicia for use playing a slot-type game. The second display 38 may be configured to display video images of games and players being played on other gaming machines 20, instructional game screens, and/or game features/game elements selection screens.

The user input device 28 includes a plurality of input buttons 40, a coin slot 42, a bill acceptor 44, and a coin tray 46 for dispensing coins to the player. In one embodiment, the input buttons 40 may include one or more BET switches 48 for inputting a wager on a game and selecting a number of rounds to be played during a gaming session, and a PAYOUT switch 50 for ending a gaming session and dispensing accumulated gaming credits to the player. In the illustrated embodiment, the gaming machine 20 may also include a start button, e.g. a SPIN switch 52 to allow the player to initiate a spin of the reels during the slot-type game 32. In addition, the user input device 28 may include, for example, a keyboard, a pointing device, a mouse, a stylus, a touch sensitive panel (e.g., a touch pad or a touch screen), a gyroscope, an accelerometer, a position detector, an audio input device, and/or any suitable input device that enables the player to interact with the gaming machine 20. Alternatively, a single component, such as a touch screen, may function as both the display device 22 and as the user input device 28.

The coin slot 42 includes an opening that is configured to receive coins and/or tokens deposited by the player into the gaming machine 20. The gaming machine 20 converts a value of the coins and/or tokens to a corresponding amount of gaming credits that are used by the player to wager on games played on the gaming machine 20. The bill acceptor 44 includes an input and output device that is configured to accept a bill, a ticket, and/or a cash card into the gaming machine 20 to enable an amount of gaming credits associated with a monetary value of the bills, ticket, and/or cash card to be credited to the gaming machine 20. Moreover, the gaming machine 20 may also utilize a cashless wagering system (not shown), such as a ticket in ticket out (TITO) system (not shown).

In the illustrated embodiment, the gaming machine 20 includes an image capture device 54 that is configured to capture and generate audio and video data indicative of images of the player. The image capture device 54 may include for example, a video camera that is configured to capture and transmit images of the player operating the gaming machine 20 to play the slot-type game 32.

In the illustrated embodiment, the user computing device 16 is configured to transmit and receive data to and/or from the system controller 14 including, but not limited to, audio and video data, video images, music, sounds, and/or any suitable data that may be transmitting to the system controller 14 for use in generating images being displayed on the display device 22. The system controller 14 may be connected to the user computing device 16 via a communications link 56 that enables the user computing device 16 to access the system controller 14 over a communications network such as, for example, the Internet, a cellular telecommunications network, a satellite communications network, a wireless network, a cable network, and/or any suitable communications network that enables the user computing device 16 to transmit data to/from the system controller 14. For example, in one embodiment, the user computing device 16 may include a mobile computing device 58, e.g. a smartphone that communicates with the system controller 14 via the cellular telecommunications network and/or the Internet. In another embodiment, the user computing device 16 may include a personal computer, laptop computer, cell phone, tablet computer, smartphone/tablet computer hybrid, personal/home video game device, personal data assistant, and/or any suitable computing device that enables a user to connect to the system controller 14. In one embodiment, the user computing device 16 may includes a portable data storage device such as, for example a USB flash drive, that may be connected to a corresponding USB data port installed in the gaming machine 20.

In one embodiment, the user computing device 16 may include a controller that is coupled to a display device 22 and a user input device 28. The controller receives and transmits information to and from the system controller 14 displays images and the graphical interfaces on the display device 22 to enable the user to interact with the system controller 14.

Referring to FIG. 3, in the illustrated embodiment, the system controller 14 includes a processor 60, a memory device 62, a gaming module 64, a database 66, a credit module 68, a display module 70, an image capture module 72, and a communications module 74. The processor 60 executes various programs, and thereby controls other components of the gaming machine 20 according to user instructions and data received from the user input device 28. The processor 60 executes a game program, and thereby enables the gaming machine 20 to generate games and allow players to play the games in response to user instructions received via the user input device 28 in accordance with the embodiments described herein.

The memory device 62 stores programs and information used by the processor 60. Moreover, the memory device 62 stores and retrieves information in the database 66 including, but not limited to, image data for producing images and/or screens on the display device 22, and temporarily stores variables, parameters, and the like that are used by the processor 60. In addition, the memory device 62 may store game data in the database 66 including, but not limited to, game features, game elements, game symbols, indicia, sounds, images, music, symbol weights, game awards, paytables, and/or winning combination tables which represent relationships between combinations of random numbers, combinations of symbol matches and types of awards associated with each game. The memory device 62 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the processor 60 to store, retrieve, and/or execute instructions and/or data.

In the illustrated embodiment, the database 66 includes a list of game features 76 that are associated with a plurality of games that may be played by the player. The list of game features 76 may include, but are not limited to including, game symbols, game sounds, game images, audio music, background images, bonus features, and/or any suitable game element that may be associated with a game. In addition, the database 66 may also include a list of player provided game elements 78 and a list a default game elements 80. The list of default game elements 80 includes a plurality of predefined game elements that are associated with one or more game features included in the list of game features 76. For example, game elements may include, but are not limited to including, symbol images associated with game symbols, image data associated with game images and game background images, sound effect data associated with game sounds, and/or audio data associated with game music. In the illustrated embodiment, the list of default game elements 80 includes a set of predefined game elements that are associated with the game features corresponding with one or more games being provided to a player via the gaming machine 20. The list of player provided game elements 78 includes one or more player provided elements that may be used with one or more game elements. For example, in one embodiment, the list of player provided game elements may include, but is not limited to, video images for use with game symbols, audio music data that may be used with game music and/or game sounds.

In the illustrated embodiment, the database 66 may also include list of player accounts 82 that includes a plurality of player accounts associated with a plurality of players. Each player account may include personal identification information such as, for example, a user name, address, personal identification number, date of birth, email address, mobile phone number, and/or any suitable information that enables the system controller 14 to identify a user. In addition, each player account includes a corresponding list of player provided game elements 78 that includes a plurality of player provided game elements that are associated with the player.

The credit module 68 manages the amount of player's credits, which is equivalent to the amount of coins and bills counted and validated by the bill acceptor 44 and/or the coin slot 42. The credit module 68 may display a credit meter (not shown) on the display device 22 including an amount of gaming credits available to the player for use in playing the game. During a gaming session, the credit module 68 may deduct an amount of credits equal to the amount of wagers made by the player from the credit meter, and credit any awards provided to the player based on the outcome of the games to the credit meter.

The display module 70 is coupled to the display device 22 to display graphical interfaces 84 (shown in FIGS. 5-7), monitor player selections received through the user input device 28, and accept various instructions and data that a player enters through the user input device 28. The display module 70 also controls the display device 22 to display various images on the graphical interfaces 84 preferably by using computer graphics and image data stored in the database 66. More specifically, the display module 70 controls the game elements, game symbols and/or images being displayed in the game such as, for example, the slot-type game 32 being displayed on the display device 22 by using computer graphics and the image data. In addition, the display module 70 may also displays a plurality of user selection areas 86 (shown in FIGS. 5 and 6) within the graphical interfaces 84 that correspond to specific operations that may be initiated by the user. For example, in one embodiment, the display module 70 may display one or more game features 88 and/or game elements 90 including an associated selection area 86 to enable the user to select a displayed game feature 88 and/or game element 90. Each of the selection areas 86 may receive a user selection input via the user input device 28.

The image capture module 72 is coupled to the image capture device 54 to operate the image capture device 54 to record video images and audio of the player and generate and store audio and video data indicative of the captured images in the database 66.

The communications module 74 communicates with the user computing device 16 and the gaming devices 12 to facilitate transmitting data over the network 18. For example, the communications module 74 communicates with the user computing device 16 and enables the player to transmit images from the user computing device 16 to the gaming machine 20 and stores the received images in the database 66 for use for use as player provided game elements. In one embodiment, the communications module 74 communicates with a social media webserver 92 for receiving and/or transmitting data to the social media webserver 92. In one embodiment, the social media webserver 92 may be provided by a social media provider such as, for example, Facebook® that provides a social media account for use by the player for displaying information and images to other users that are visible through a website provided by the social media provider. In another embodiment, the social media provider may include a cloud computing service such as, for example, Dropbox™ that allows the player to store images on a cloud storage account.

In one embodiment, the communications module 74 may transmit images to the social media webserver 92 for use by the social media provider in associating the received images with a corresponding social media account associated with the player for use in displaying, e.g. "posting" the images on the player's social media account. In addition, the communications module 74 may receive images from the social media webserver 92 and store the images in the database 66. For example, the communications module 74 may allow the player to access an associated social media account hosted on the social media webserver 92 and allow the player to download images and data such as video photographs from the social media account for use as player provided game elements.

The gaming module 64 includes a game program for use in playing a game based on players selections received from the display device 22. The gaming module 64 retrieves game features and game elements from the database 66, and causes the display module 70 to display the game on the display device 22. The gaming module 64 receives signals indicative of the player input, generates an outcome of the game based on the predetermined game rules and the received player selections, and displays the game outcome on the display device 22.

In the illustrated embodiment, the gaming module 64 includes a game feature unit 94, a player selection unit 96, and a random number generator (RNG) 98. The RNG 98 generates and outputs random numbers to the gaming module 64 for use in playing the game 32. In addition, the gaming module 64 may use random numbers generated by the RNG 98 to determine if a winning condition has occurred in the outcome of the game 32 and to determine whether or not to provide an award to a player. For example, if the game is the slot-type game 32, the gaming module 64 uses the RNG 98 to randomly select an arrangement of symbols to be displayed on video reels (shown in FIG. 7). In general, the term "award" may be a payout, in terms of credits or money. However, it should be noted that the term award may also refer to other types of awards, including, prizes, e.g., meals, show tickets, etc. . . . , as well as in-game award, such as free games and/or a bonus feature game and/or an enhanced award.

The game feature unit 94 is configured to determine one or more game features that are associated with the slot-type game 32 and retrieve the game features 88 from the list of game features 76 stored in the database. In addition, the game feature unit 94 determines if the game feature 88 includes an associated player provided game element or a predefined game element and generates and displays the game feature with the corresponding player provided game element and/or the predefined game element. For example, in one embodiment, the list of game features 76 may include one or more game features 88 that may include a player provided game element. The game feature unit 94 determines if the list of game features 76 includes a game feature 88 that may include a player provided game element and determines if an associated player provided game element is included in the list of player provided game elements being stored in the database 66. If a corresponding player provided game element is included in the database, the game feature unit 94 responsively generates the corresponding game feature 88 including the associated player provided game element. If a corresponding player provided game element is not included in the list of player provided game elements 78, the game feature unit 94 selects a predefined game element from the list of default game elements 80 contained in the database 66.

Figure 5:
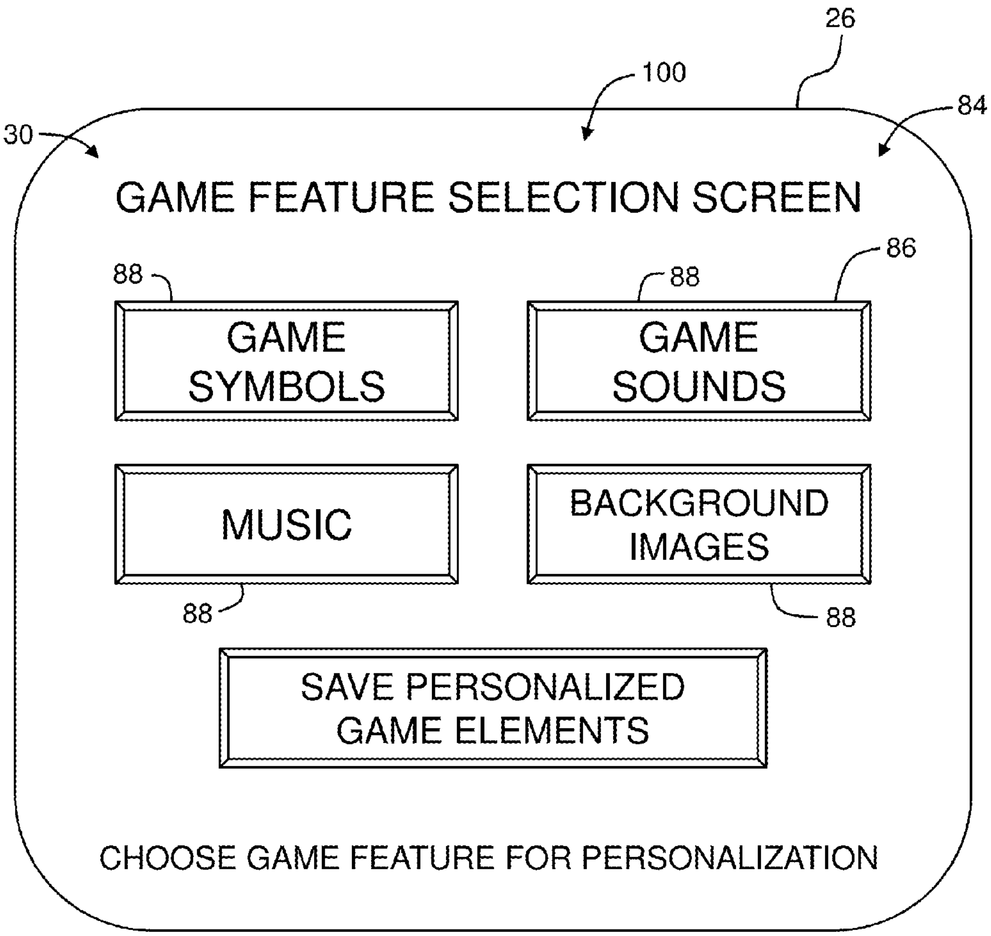
FIG. 5 is an exemplary entertaining graphical display of a game feature selection screen that may be used with the method shown in FIG. 4, according to an embodiment of the present invention.
Figure 6:
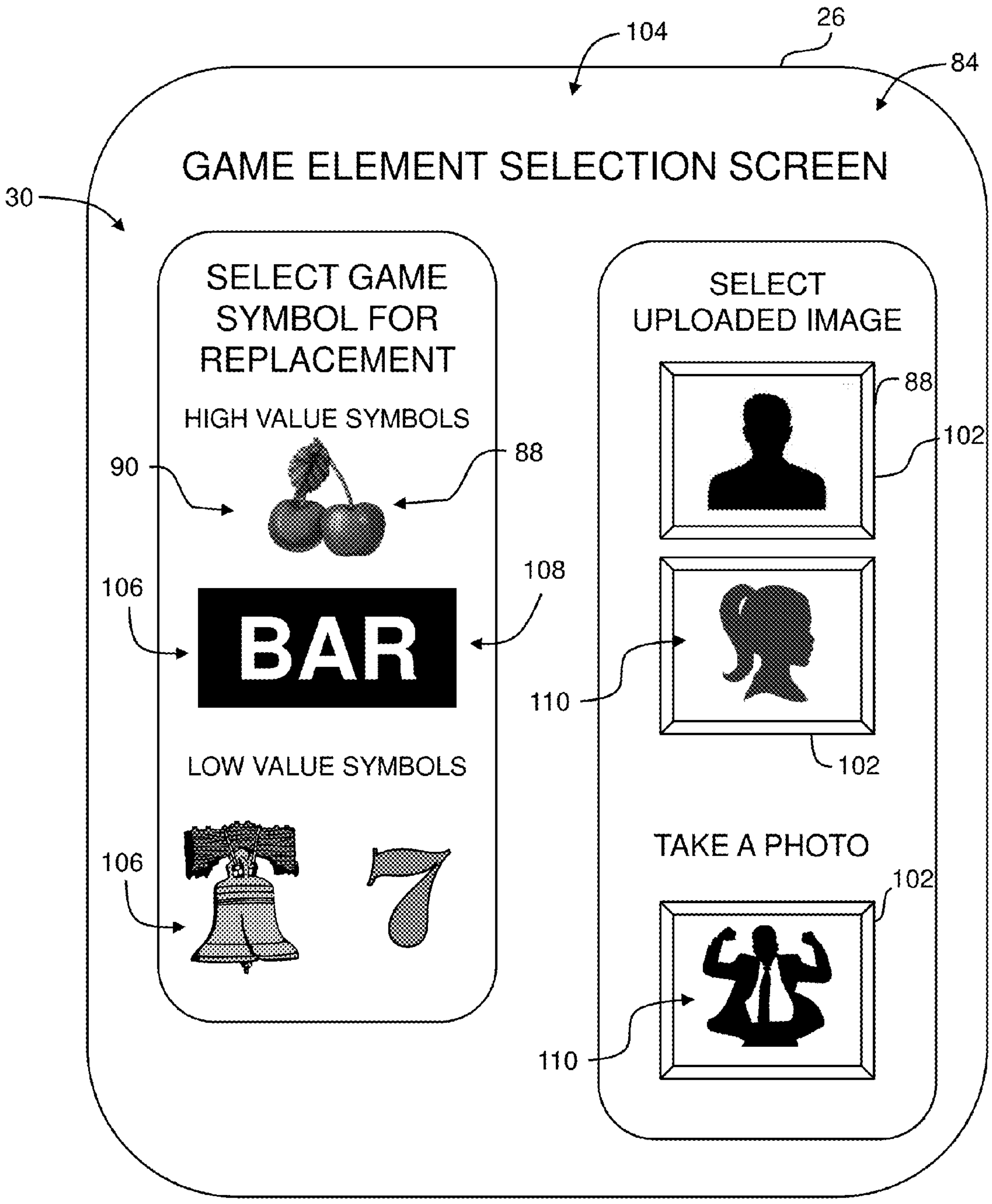
FIG. 6 is an exemplary entertaining graphical display of a game element selection screen that may be used with the method shown in FIG. 4, according to an embodiment of the present invention.

The player selection unit 96 is configured to receive audio/video data from the user computing device and/or social media webserver 92 and generate and store player provided game elements in the database 66. In addition, the player selection unit 96 allows the player to select one or more game features 88 and to associated a player provided game elements with one or more selected game features 88. For example, in one embodiment, the player selection unit 96 may display a game feature selection screen 100 (shown in FIG. 5) that includes a plurality of game features 88 that may be displayed with player provided game elements 102, and allows the player to select one or more game features 88 to be associated with a player provided game element 102. In addition, the player selection unit 96 may also display a game element selection screen 104 that includes a plurality of predefined game elements 106 that are associated with a selected game feature 88 and a plurality of player provided game elements 102, and allow the player to select one or more player provided game elements 102 for use with the selected game feature 88. For example, as shown in FIG. 6, the player selection unit 96 allows the player to select one or more predefined symbol images 108 that are used in the slot-type game 32, and replace the predefined symbol images 108 with one or more player provided personal images 110. In addition, the player selection unit 96 may also allow the player to create a player account 82 that is stored in the database 66 and that includes one or more player provide game elements 102 that have been uploaded to the database 66.

Figure 4:
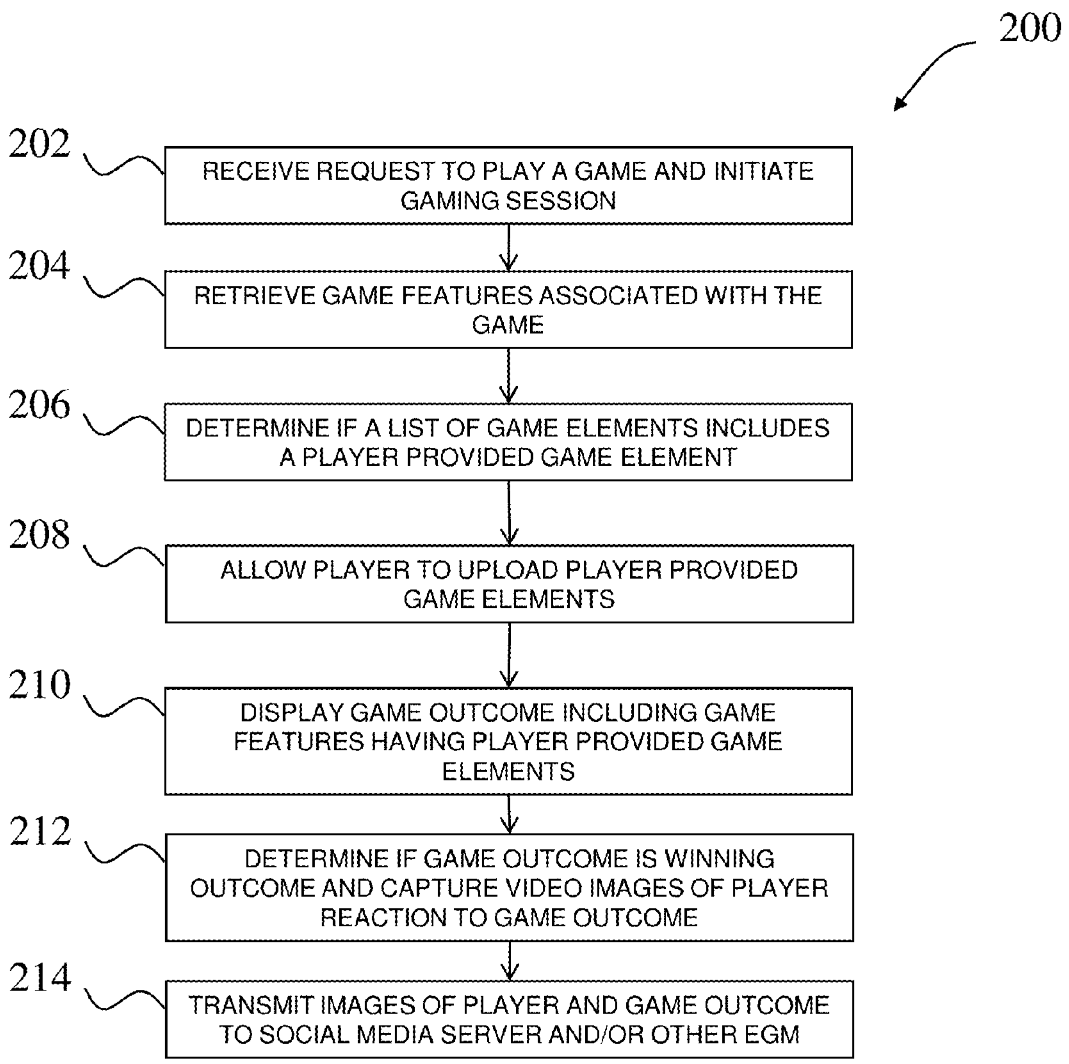
FIG. 4 is a flowchart of a method that may be used with the system shown in FIG. 1 for allowing a player to play a game having player provided game elements, according to an embodiment of the invention.
Figure 7:
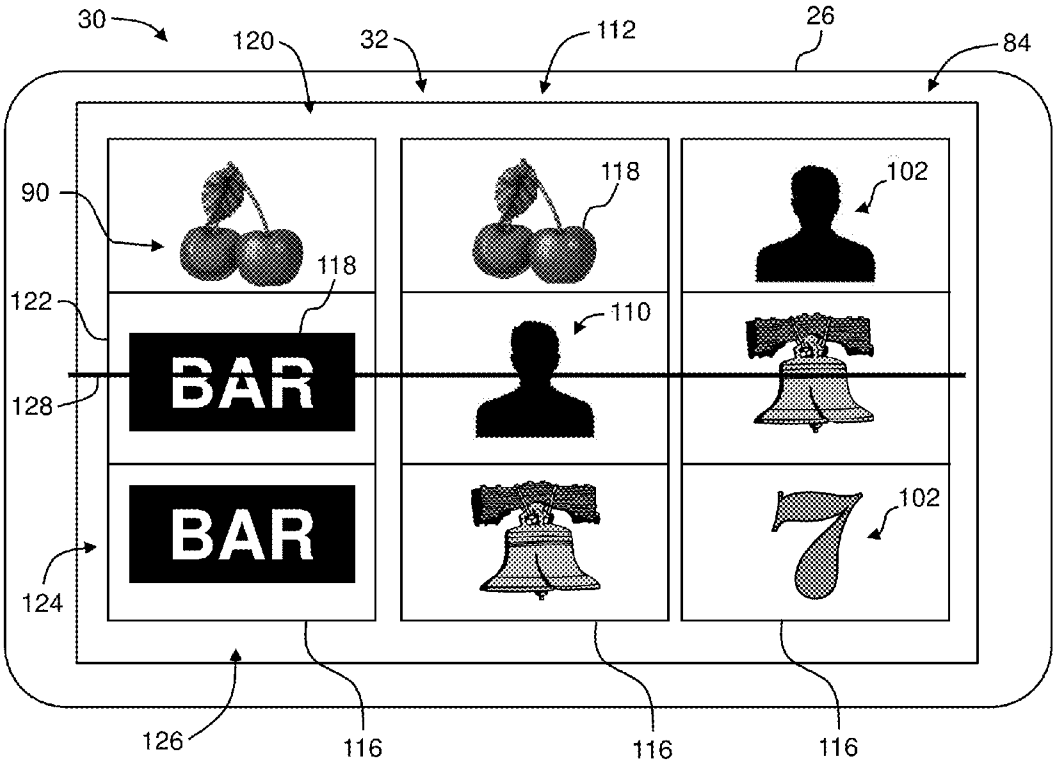
FIG. 7 is an exemplary entertaining graphical display of a game screen that may be used with the method shown in FIG. 4, according to an embodiment of the present invention.
Figure 8:
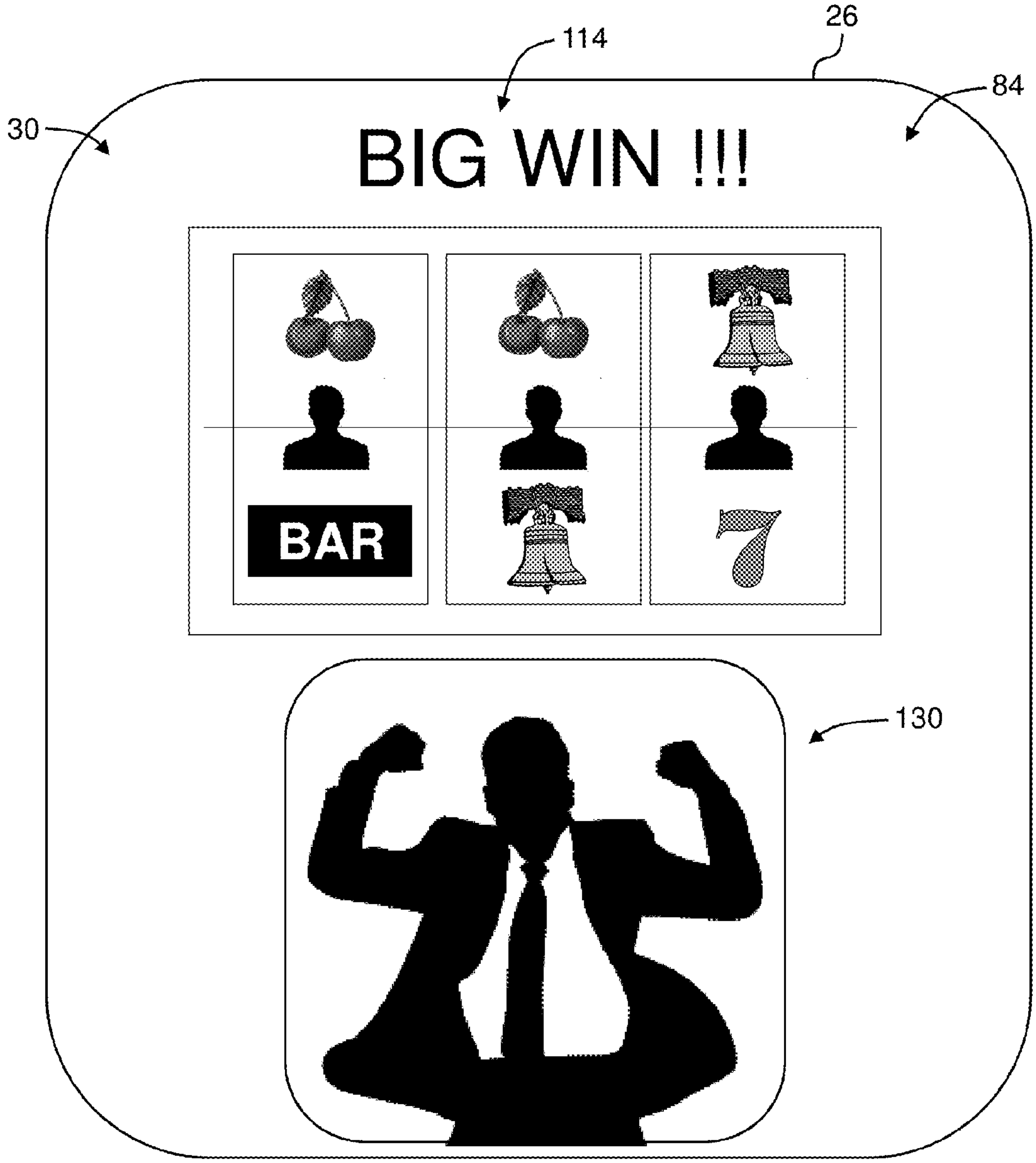
FIG. 8 is an exemplary entertaining graphical display of a celebratory screen that may be used with the method shown in FIG. 4, according to an embodiment of the present invention.

FIG. 4 is a flowchart of a method 200 that may be used with the system 10 for allowing a player to play a game including player provided game elements via the gaming machine 20. Each method step may be performed independently of, or in combination with, other method steps. Portions of the method 200 may be performed by any one of, or any combination of, the components of the system 10. FIG. 5 is an exemplary entertaining graphical display of a game feature selection screen 100 that may be displayed by the system 10. FIG. 6 is an exemplary entertaining graphical display of a game element selection screen 104 that may be displayed by the system. FIG. 7 is an exemplary entertaining graphical display of a game screen 112 that may be displayed by the system 10. FIG. 8 is an exemplary entertaining graphical display of a celebratory screen 114 that may be displayed by the system 10. In the illustrated embodiment, entertaining graphical displays for amusement purposes are presented by the display device 22 (shown in FIG. 1) and may receive input (e.g., selections and/or entries) via the user input device 28 (shown in FIG. 1).

In the illustrated embodiment, in the method step 202, the gaming module 64 receives a request from a player to play the game 32 and responsively initiates a gaming session including displaying the game 32 in response to a request received from the player. In one embodiment, method step 202 may also include receiving a wager from the player and/or receiving a request to purchase a play of the game with game credits from a corresponding credit meter.

In method step 202, the gaming module 64 displays a game screen 112 including a game in response to the request received from the player. In the illustrated embodiment, the gaming module 64 displays the slot-type game 32 within the game screen 112. However, it should be noted that the gaming module 64 may display any type of game upon which a player could make a wager and/or purchase a game play including, but not limited to a bingo game, a blackjack game, a video poker game, or any type of game that enables the system 10 to function as described herein.

In the illustrated embodiment, the gaming module 64 displays the slot-type game 32 including a plurality of reels 116 with each reel 116 being displayed with a plurality of game symbols 118. The reels 116 are displayed in a grid 120 having a plurality of cells 122 being arranged in a plurality of rows 124 and a plurality of columns 126. Each reel 116 is associated with a corresponding column 126, and each cell 122 displays one or more game symbols 118. The slot-type game 32 may also include a plurality of paylines 128 that extend across one or more cells 122 to indicate, to the player, a combination of game symbols 118. In the illustrated embodiment, the slot-type game 32 is generally player in a conventional manner. During game play, the player makes a wager, which may be based on a predetermined denomination and a selected number of paylines, and the gaming module 64 randomly generates an outcome for the game, spins the reels 116, and selectively stops the reels 116 to display a game symbol 118 in each of the cells 122. The gaming module 64 determines if a pattern of symbols 118 being formed along the payline 128 matches a winning combination, and responsively provides an award to the player as a function of the combination formed along the selected payline 128, the wager, and a predetermined paytable. Many variations to the above described general play of a slot game fall within the scope of the present invention.

In one embodiment, the gaming machine 20 may include a plurality of mechanical reels (not shown) with each game symbol being displayed with a corresponding reel. In addition, the gaming machine 20 may also includes a video display screen that overlays the mechanical reels for use in displaying secondary game symbols such as, for example, player provided game symbols, that overlay the symbols being displayed on the mechanical reels. For example, during a game being played with mechanical reels, the gaming module 64 may determine the game symbols being associated with one or more player provided game elements, and display the player provided game elements in the video display screen as the underlying game symbol is rotated through the game screen 112 by the corresponding mechanical reel.

In method step 204, the gaming module 64 determines the game features 88 associated with the slot-type game 32 and retrieves one or more game features 88 from the list of game features included in the database 66. The game features 88 may include, but are not limited to, game symbols, game sounds, game music, bonus features, and/or game background images. The gaming module 64 may also determine if one or more game features 88 includes a replaceable game element. The replaceable game element 90 may be displayed with a default game element selected from the list of default game elements 80 or a player provided game element that is selected from the list of player provided game elements 78. For example, in one embodiment, the slot-type game 32 may include a game feature 88 including a plurality of game symbols 118 that are used with the slot-type game 32. The gaming module 64 may identify one or more game symbols 118 as being a replaceable game element 90 that may be displayed with a default game symbol, e.g. a predefined symbol images 108 or a player provided game symbol, e.g. player provided personal images 110. In addition, the gaming module 64 may display the slot-type game 32 having a replaceable game element 90 including game sounds and/or game music, and display the slot-type game 32 with a default game sound and/or default game music or with player provided game sounds and/or player provided game music.

In method step 206, the gaming module 64 determines if one or more of the associated game features 88 includes a replaceable game element 90 and determines if determine if the list of player provided game elements 78 includes a player provided game element 102 being associated with the retrieved game feature 88. If the list of player provided game elements 78 includes a player provide game element that is associated with a corresponding replaceable game element, the gaming module 64 retrieves the associated player provided game element 102 for use during the slot-type game 32. In one embodiment, if the list of player provided game elements 78 does not include a player provided game element that is associated with the game feature 88 and/or the replaceable game element 90, the gaming module 64 may select a corresponding predefined game element 106 from the list of default game elements 80 and display the slot-type game 32 included the corresponding predefined game element 106.

In method step 208, the gaming module 64 allows the player to upload one or more player provided game elements 102 for use during play of the slot-type game 32. In one embodiment, the gaming module 64 may display the game feature selection screen 100 including a plurality of game features 88 being associated with the slot-type game 32 and that include one or more replaceable game elements. The gaming module 64 allows the player to select one or more game features 88 to be associated with one or more player provided game elements 102, receives and stores a player provided game element 102 in the database 66, and associates the player provided game element 102 with the selected game feature 88. The gaming module 64 may also request a player ID from the player in response to the request to play the game. The gaming module 64 may also determine a player account being associated with the player ID and retrieve any player provided game elements 102 being associated with the player account from the database 66.

In one embodiment, the gaming module 64 may receive a signal indicative of a player provided element via a personal mobile device 58, identify the game feature 88 being associated with the received player provided game element 102, and store the received player provided game element 102 in the database 66. For example, in one embodiment, upon receiving the player's selection of a game feature 88, the gaming module 64 may display the game element selection screen 104 including a plurality of game elements 90 that are associated with the selected game feature 88. The gaming module 64 allows the player to transmit one or more player provided game elements to the gaming machine 20 and displays the received player provided game elements 102 on the game element selection screen 104 to allow the player to replace one or more game elements 90 with a player provided game element 102. For example, as shown on FIG. 6, the gaming module 64 may display a plurality of replaceable game symbols 118 being associated with a selected game feature 88. In addition, the gaming module 64 may also display video images 110 received from the player via the user computing device 16. The gaming module 64 allows the player to select one or more replaceable game symbols 118 and select one or more player provided images 110 that may be used by the gaming module 64 to as game symbols to replace the selected replaceable game symbols 118.

In one embodiment, the gaming module 64 may operate the image capture device 54 in response to a request received by the player and store the image in the database for use as a player provided game element 102. For example, as shown in FIG. 6, the gaming module 64 may allows the player to operate the image capture device 54 to take a video photograph of the player for use as a game symbol 118.

In addition, each replaceable game symbol 118 may have a different game value and/or a different frequency of appearance on a corresponding reel 116. For example, symbols having a high value (e.g. associated with a larger award value) may appear less frequently on the reels than a lower value symbol. The gaming module 64 may determine a value and/or a frequency of each replaceable game symbol 118 and display the value and/or frequency to the player to allow the player to select a personal image to appear at a high frequency and/or to be associated with a large payout.

In method step 210, the gaming module 64 randomly determines an outcome of the slot-type game 32 and displays the outcome including the retrieved game feature 88 including the corresponding player provided game element 102. For example, as shown in FIG. 7, the gaming module 64 may display the slot-type game 32 having the player provided game elements 102 being displayed on one or more reels 116. In addition, the gaming module 64 may play game music selected from the list of player provided game elements 78.

In method step 212, the gaming module 64 may determine if the randomly generated outcome of the slot-type game 32 is a winning outcome and responsively operate the image capture device 54 to capture video images 130 of the player during display of the game outcome.

In method step 214, the gaming module 64 may transmit the captured images of the player to the social media webserver 92 to allow the player to post the winning reaction to a social media account associated with the player. In one embodiment, the gaming module 64 may generate a celebratory screen 114 that displays images and/or live video of the winning outcome being displayed by the gaming machine 20 and images and/or live video of the player during display of the winning outcome. In addition, the gaming module 64 may display the celebratory screen 114 on other gaming machines 20, other display devices 22, and/or transmit the celebratory screen 114 to the user computing device 16 and/or the social media webserver 92. In one embodiment, the gaming module 64 may display the slot-type game 32 on the first display 36 and simultaneously display the celebratory screen 114 on the second display 38

In one embodiment, the gaming module 64 may determine a completion of the gaming session and remove the player provided game elements 102 from the database 66. The gaming module 64 may determine the end of the gaming session upon detecting a triggering condition such as for example, completing the display of the game outcome, the player selecting the payout switch 50, and/or a predefined period of time after display of the game outcome.

In another embodiment, the gaming module 64 generates and stores a player account in the database 66 including the player provided game element 102. In addition, the gaming module 64 associates a unique player identification with the player account that enables the player to use the player provided game elements 102 with another gaming machine 20.

Those skilled in the art will readily appreciate that methods and systems of the embodiments of the invention may include various computer and network related software and hardware, such as programs, operating systems, memory storage devices, input/output devices, processors, servers, data communication links, whether wireless or otherwise, and data transceiving devices. Those skilled in the art will further appreciate that the precise types of software and hardware used are not vital to the full implementation of the embodiments of the invention so long as they are provided in accordance with the methods and systems described herein.

It should be understood that the embodiments of the invention may be implemented with one or more gaming machines, gaming establishments and throughout multiple jurisdictions. Moreover, the systems and methods according to the embodiments of the invention are suitable for non-wagering electronic devices (e.g., arcade games).

While exemplary systems, methods and applications of the systems and methods of the invention have been described herein, it should also be understood that the foregoing is only illustrative of exemplary embodiments of the invention, as well as some of the principles of the invention, and that various modifications can be made by those skilled in the art without departing from the scope and spirit of the underlying invention. Therefore, the described embodiments should not be considered as limiting of the invention in any way. Accordingly, the invention embraces alternatives, modifications and variations which fall within its spirit and scope as described herein and in the accompanying materials which describe an exemplary, non-limiting embodiment of the invention.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Those skilled in the art will readily appreciate that the systems and methods described herein may be a standalone system or incorporated in an existing gaming system. The system of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto, either through a mobile device, gaming platform, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. An electronic gaming device for allowing a player to play a game having player provided game elements, comprising:

a display device for displaying a game to a player;

an input device configured to receive player input and generate a signal indicative of the player input and information relating to a monetary value enabled for wagering in the game;

a database including a plurality of game features being associated with the game and a list of game elements, the list of game elements including at least one player provided game element being associated with at least one of the plurality of game features, the player provided game element comprising data transmitted to the database prior to the player provided game element being associated with the at least one of the plurality of game features;

a controller including a processor coupled to the display device, the input device and the database, the controller being in communication with a random number generator for facilitating random game outcomes during a gaming session and configured to:

initiate a gaming session including displaying the game in response to a request received from the player and information relating to a monetary value being wagered;

retrieve a game feature associated with the game from the database during the gaming session;

determine by the processor during the gaming session if the list of game elements includes a player provided game element associated with the retrieved game feature;

randomly determine by the processor in communication with the random number generator, an outcome of the game during the gaming session; and display on the display device the outcome of the game including the retrieved game feature and the player provided game element associated with the retrieved game feature during the gaming session.

2. An electronic gaming device in accordance with claim 1, the controller configured to display the retrieved game feature including a predefined game element if the list of game elements does not include an associated player provided game element.

3. An electronic gaming device in accordance with claim 1, the player provided game element including at least one of a game symbol, a game sound, a game music, and a game background image.

4. An electronic gaming device in accordance with claim 1, the controller configured to remove the player provided game elements from the database upon completion of the gaming session.

5. An electronic gaming device in accordance with claim 1, the controller configured to:

receive a signal indicative of a player provided element via a personal mobile device;

identify a game feature being associated with the received player provided element; and store the received player provided element in the database.

6. An electronic gaming device in accordance with claim 5, the controller configured to:

display a game feature selection screen including a plurality of game features being associated with the game;

allow the player to select at least one of the plurality of game features; and receive and store the received player provided element in the database, the player provided element being associated with the selected game feature.

7. An electronic gaming device in accordance with claim 5, the controller configured to generate and store a player account in the database, the player account including a unique player identification being associated with the player and the list of game elements including at least one player provided game element being associated with the player.

8. An electronic gaming device in accordance with claim 1, further comprising:

a video image device for capturing and generating images of the player, the controller configured to:

determine if the outcome is a winning outcome and responsively capture images of the player as the outcome of the game is being displayed; and transmit the captured player images to a social media server for use in displaying the captured player images with a social media account associated with the player.

9. A system for allowing a player to play a game having player specified game elements, comprising:

a plurality of electronic gaming devices, each gaming device including a display device for displaying a game to a player;

a database including a plurality of game features being associated with the game and a list of game elements, the list of game elements including at least one player provided game element being associated with at least one of the plurality of game features, the player provided game element comprising at least image data transmitted to the database responsive to player input prior to the player provided game element being associated with the at least one of the plurality of game features;

a controller including a processor coupled to each electronic gaming device and the database, the controller being in communication with a random number generator for facilitating random game outcomes during a gaming session and configured to:

initiate a gaming session including displaying the game on at least one of the plurality of electronic gaming devices in response to a request received from the player;

retrieve a game feature associated with the game from the database during the gaming session;

determine by the processor during the gaming session if the list of game elements includes a player provided game element associated with the retrieved game feature;

randomly determine by the processor in communication with the random number an outcome of the game; and display on a display device the outcome of the game including the retrieved game feature and the player provided game element associated with the retrieved game feature during the gaming session.

10. A system in accordance with claim 9, the controller configured to display the retrieved game feature including a predefined game element if the list of game elements does not include an associated player provided game element.

11. A system in accordance with claim 9, the player provided game element including at least one of a game symbol, a game sound, a game music, and a game background image.

12. A system in accordance with claim 9, the controller configured to remove the player provided game elements from the database upon completion of the gaming session.

13. A system in accordance with claim 9, the controller configured to:

receive a signal indicative of a player provided element via a personal mobile device;

identify a game feature being associated with the received player provided element; and store the received player provided element in the database.

14. A system in accordance with claim 13, the controller configured to:

display a game feature selection screen on the at least one electronic gaming device, the game feature selection screen including a plurality of game features being associated with the game;

allow the player to select at least one of the plurality of game features; and receive and store the received player provided element in the database, the player provided element being associated with the selected game feature.

15. A system in accordance with claim 13, the controller configured to generate and store a player account in the database, the player account including a unique player identification being associated with the player and the list of game elements including at least one player provided game element being associated with the player.

16. A system in accordance with claim 9, further comprising:

a video image device capturing and generating images of the player, the controller configured to:

determine if the outcome is a winning outcome and responsively capture player images of the player as the outcome of the game is being displayed; and display the capture player images on the display device being associated with a different electronic gaming device.

17. A method of allowing a player to play a game on an electronic gaming device having player specified game elements, the electronic gaming device including a display device, a random number generator, a system controller having a processor, an input device configured to receive player input and generate a signal indicative of a player's input and information relating to a monetary value enabled for wagering in the game, and a database including a plurality of game features stored therein with each gaming feature having at least one game element, the controller being in communication with the display device, the random number generator, the input device and the database, and configured to provide the method comprising the steps of:

initiating by the system controller a gaming session responsive to a player input through the input device including displaying a game on the display device;

receiving in the database a player provided game element, the player provided game element comprising at least image data;

the system controller associating the player provided game element with a game element of at least one game feature stored in the database during the gaming session;

retrieving by the system controller a game feature associated with the game from the database;

determining by the system controller if the retrieved game feature includes an associated player provided game element;

randomly determining by the system controller in communication with the random number generator an outcome of the game; and displaying on the display device for the duration of the gaming session the outcome including the retrieved game feature and the associated player provided game element.

18. A method in accordance with claim 17, including the steps of:

receiving a signal indicative of a player provided element via a personal mobile device;

identifying a game feature being associated with the received player provided element; and storing the received player provided element in the database.

19. A method in accordance with claim 18, including the steps of:

displaying a game feature selection screen including a plurality of game features being associated with the game;

allowing the player to select at least one of the plurality of game features; and receiving and storing the received player provided element in the database, the player provided element being associated with the selected game feature.

20. A method in accordance with claim 17, including the steps of:

generating video images of the player as the outcome of the game is being displayed;

determining if the outcome is a winning outcome and responsively capture player images of the player as the outcome of the game is being displayed; and transmitting the captured player images to a social media server for use in displaying the captured player images with a social media account associated with the player.

* * * * *